United States Patent
Ko

(10) Patent No.: US 8,198,889 B2
(45) Date of Patent: Jun. 12, 2012

(54) MAGNETIC SENSOR FOR AN ELEVATING MOTOR

(76) Inventor: Chen-Hui Ko, Taoyuan Hsien (TW)

( * ) Notice: Subject to any disclaimer, the term of this patent is extended or adjusted under 35 U.S.C. 154(b) by 375 days.

(21) Appl. No.: 12/461,352

(22) Filed: Aug. 10, 2009

(65) Prior Publication Data

US 2011/0031964 A1 Feb. 10, 2011

(51) Int. Cl.
*G01B 7/30* (2006.01)
(52) U.S. Cl. .................... 324/207.25; 324/226
(58) Field of Classification Search ............ 324/207.25, 324/177, 139, 143, 167, 173, 146, 151 R, 324/331, 345, 377, 200, 228, 246, 207.22–207.26
See application file for complete search history.

(56) References Cited

U.S. PATENT DOCUMENTS

| | | | | |
|---|---|---|---|---|
| 5,926,017 A | * | 7/1999 | Von Grunberg et al. | 324/166 |
| 6,163,148 A | * | 12/2000 | Takada et al. | 324/226 |
| 6,964,632 B1 | * | 11/2005 | Ko | 482/54 |
| 7,946,555 B2 | * | 5/2011 | Ikeda | 251/129.11 |
| 2007/0290680 A1 | * | 12/2007 | Hattori | 324/207.25 |

* cited by examiner

*Primary Examiner* — Huy Q Phan
*Assistant Examiner* — Alesa Allgood
(74) *Attorney, Agent, or Firm* — Rosenberg, Klein & Lee

(57) ABSTRACT

A magnetic sensor for an elevating motor, and more particularly to a magnetic sensor whose magnetic induction elements are sealed within a magnetically non-permeable minor sleeve. Meanwhile, a signal transmission line is extended therefrom. In addition, the minor sleeve and the magnetic induction elements are disposed within a gear box of the elevating motor. Since the magnetic sensor in accordance with the invention is designed in a built-in type, it is not easily affected and damaged by the external environment. As a result, the service life may be prolonged. Moreover, it is modularized for a compact structure and a practical installation. In addition, it approaches more to the rotational and magnetic pole, thereby enhancing the measuring accuracy.

5 Claims, 6 Drawing Sheets

MAGNETIC SENSOR FOR AN ELEVATING MOTOR

BACKGROUND OF THE INVENTION

1. Field of the Invention

The invention relates to a magnetic sensor for an elevating motor, and more particularly to a magnetic sensor whose magnetic induction elements are sealed within a magnetically non-permeable minor sleeve. Meanwhile, a signal transmission line is extended therefrom. In addition, the minor sleeve and the magnetic induction elements are disposed within a gear box of the elevating motor.

2. Description of the Related Art

There are a great number of motors that are differently designed according to different requirements. As shown in FIG. 1, an elevating motor 10 applied to the treadmill substantially includes a gear box 11 in which a transmission gear (not shown) is disposed. A motor 12 is employed for supplying power to the transmission gear that enables a threaded rod 14 to retract or extend axially in a sleeve 13. In this way, the elevating motor 10 is utilized for adjusting the inclination of a platform 20 relative to a base frame 30. In other words, the tilt angle of the platform 20 is adjustable to meet different requirements of the operators on the tilt angle of the platform 20. In order to control the tilt angle of the platform 20, it is quite normal to install a sensor (not shown) for detecting the tilt angle of the platform 20 at a certain place of the treadmill 40. Accordingly, the change of the driving motion of the elevating motor 10 is measured and controlled for adjusting the tilt angle of the platform 20. However, this conventional elevating motor 10 requires a sensor positioned outside to provide the measuring signals of the driving motion change thereof, thereby controlling the driving state.

Nevertheless, the conventional sensor of the driving motion change is disposed at the external side of the elevating motor 10. It will take much time and cause difficulties in assembly. Moreover, the detection will be easily affected by the external environment, thereby reducing the accuracy. In addition, the structure will be easily damaged as well so that the service life is much lowered. Thus, these problems require further improvements.

According to the prior art, it is also quite normal to install a magnetic sensor between the rotor and the stator of the motor for detecting the speed of the rotor. The detection results are used for an accurate control. However, the structure of the elevating motor is different from that of the normal motor. Therefore, it is not easy to secure it to the inside of the gear box of the transmission mechanism. Therefore, there are still many problems to be overcome.

SUMMARY OF THE INVENTION

An object of the invention is to provide a magnetic sensor for an elevating motor that is designed in a built-in type and is not easily affected and damaged by the external environment. As a result, the service life may be prolonged. Moreover, it is modularized for a compact structure and a practical installation.

Another object of the invention is to provide a magnetic sensor for an elevating motor that is designed in a built-in type such that it approaches more to the rotational and magnetic pole, thereby enhancing the measuring accuracy.

In order to achieve the above-mentioned object, a magnetic sensor for an elevating motor in accordance with the invention includes:

a) a gear box internally having a reduction gear unit and a transmission gear meshed with the reduction gear unit;
b) a motor secured to the outside of the gear box for driving the gears within the gear box; and
c) a screw rod passing through the gear box and screwed with the transmission gear, wherein the gear box is provided with a mounting hole for the insertion of a magnetic sensor into the gear box, thereby creating a built-in structure for detecting magnetic elements rotatable with the transmission gear such that the change of the internal magnetic force lines within the housing may be detected by the magnetic sensor, thereby achieving a non-contact rotation detection; and wherein the magnetic sensor includes:

i) a circuit board provided with magnetic induction elements; and
ii) a transmission line extended outwards from the circuit board for sending out detection signals.

According to the above-mentioned features, a minor sleeve is made by a magnetically non-permeable material and has an opening that is sealed off after the insertion of the circuit board into the minor sleeve.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

First of all, referring to FIGS. 2 through 6, a magnetic sensor for an elevating motor in accordance with the invention includes a gear box 60, and a screw rod 80.

Figure 4:
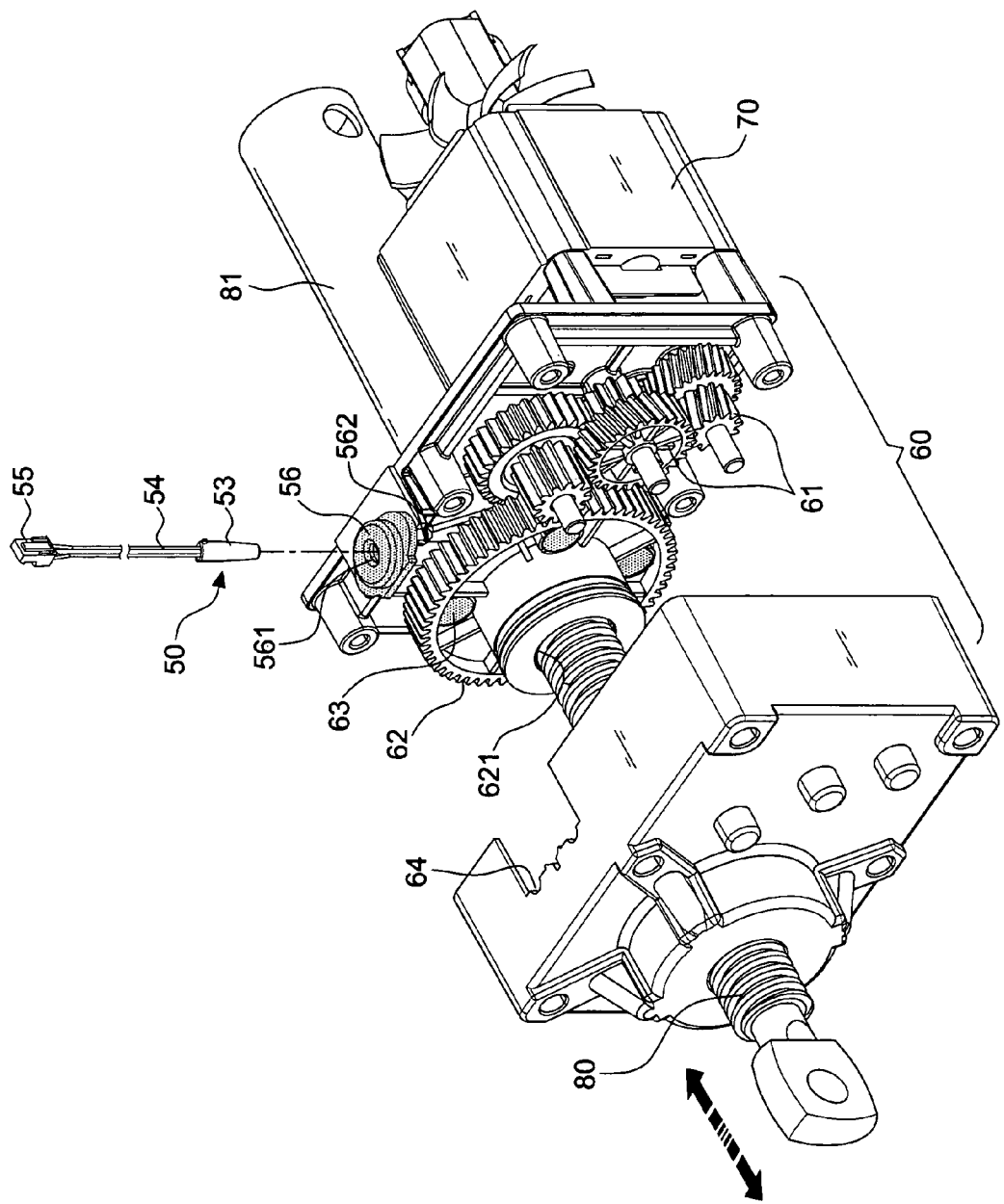
FIG. 4 is an exploded perspective view of the magnetic sensor in accordance with the invention prior to attachment to a gear box.
Figure 5:
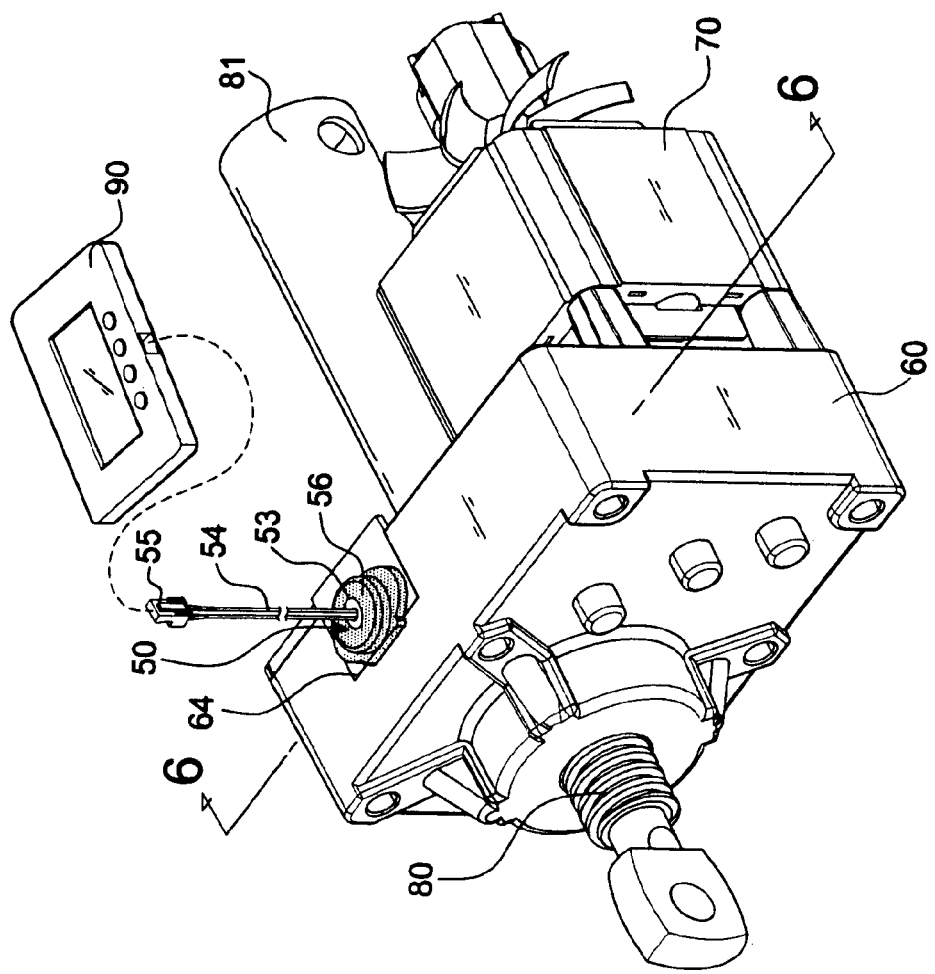
FIG. 5 is an perspective assembly view of the magnetic sensor in accordance with the invention after attachment to the gear box.
Figure 6:
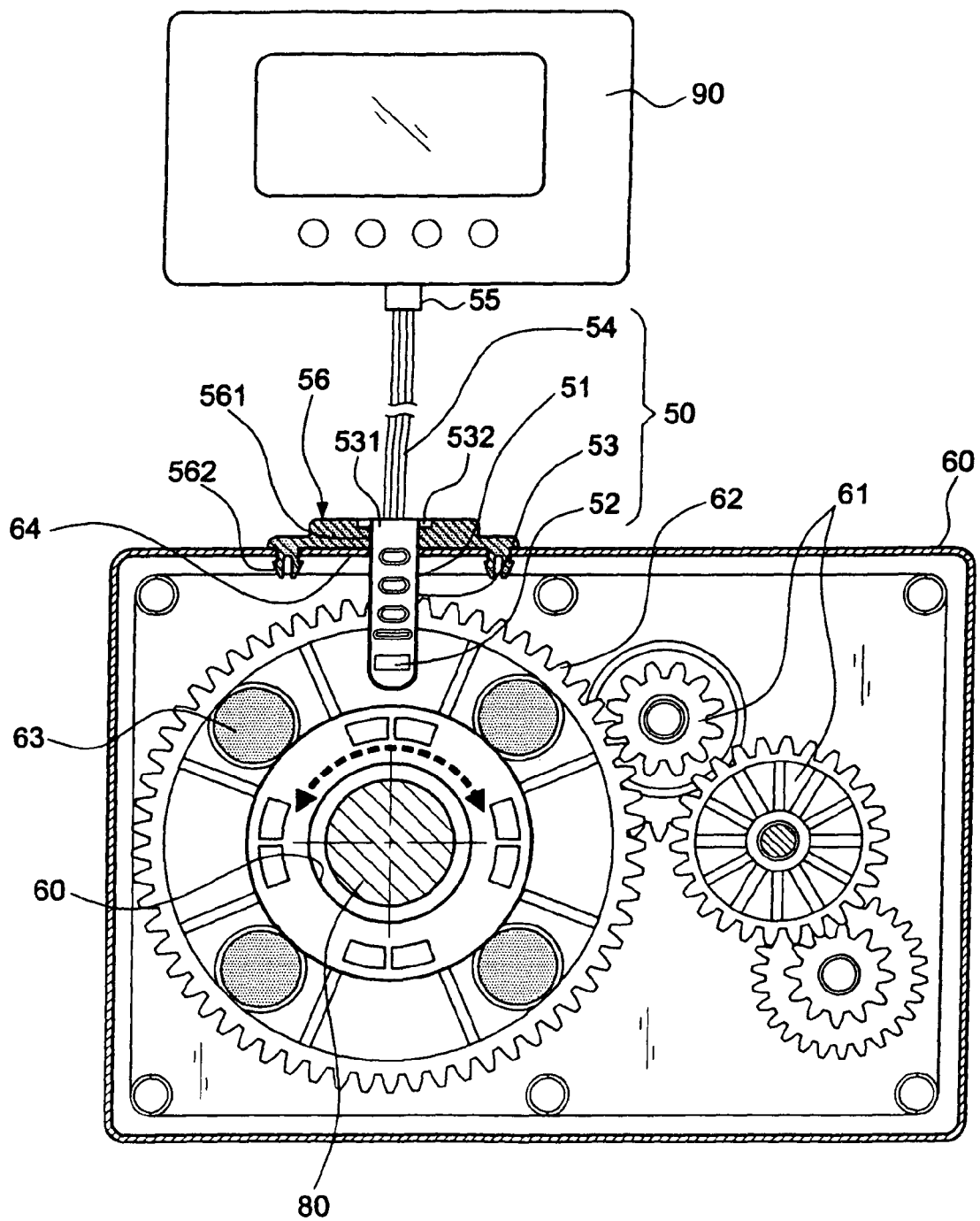
FIG. 6 is a cross-sectional view taken along the line 6-6 in FIG. 5.

As shown in FIGS. 4 and 6, the gear box 60 internally includes a reduction gear unit 61 and a transmission gear 62 meshed with the reduction gear unit 61. A threaded sleeve 621 is formed at the center of the transmission gear 62. A motor 70 is secured to the outside of the gear box 60 for driving the gears within the gear box 60. According to the embodiment, the motor 70 drives the reduction gear unit 61 that brings the transmission gear 62 in rotation.

The screw rod 80 passes through the gear box 60 and is screwed with the transmission gear 62. In other words, the screw rod 80 passes through the threaded sleeve 621. In this way, the screw rod 80 is driven to retract and extend axially within a mounting tube 81 when the transmission gear 62 is rotated.

Figure 1:
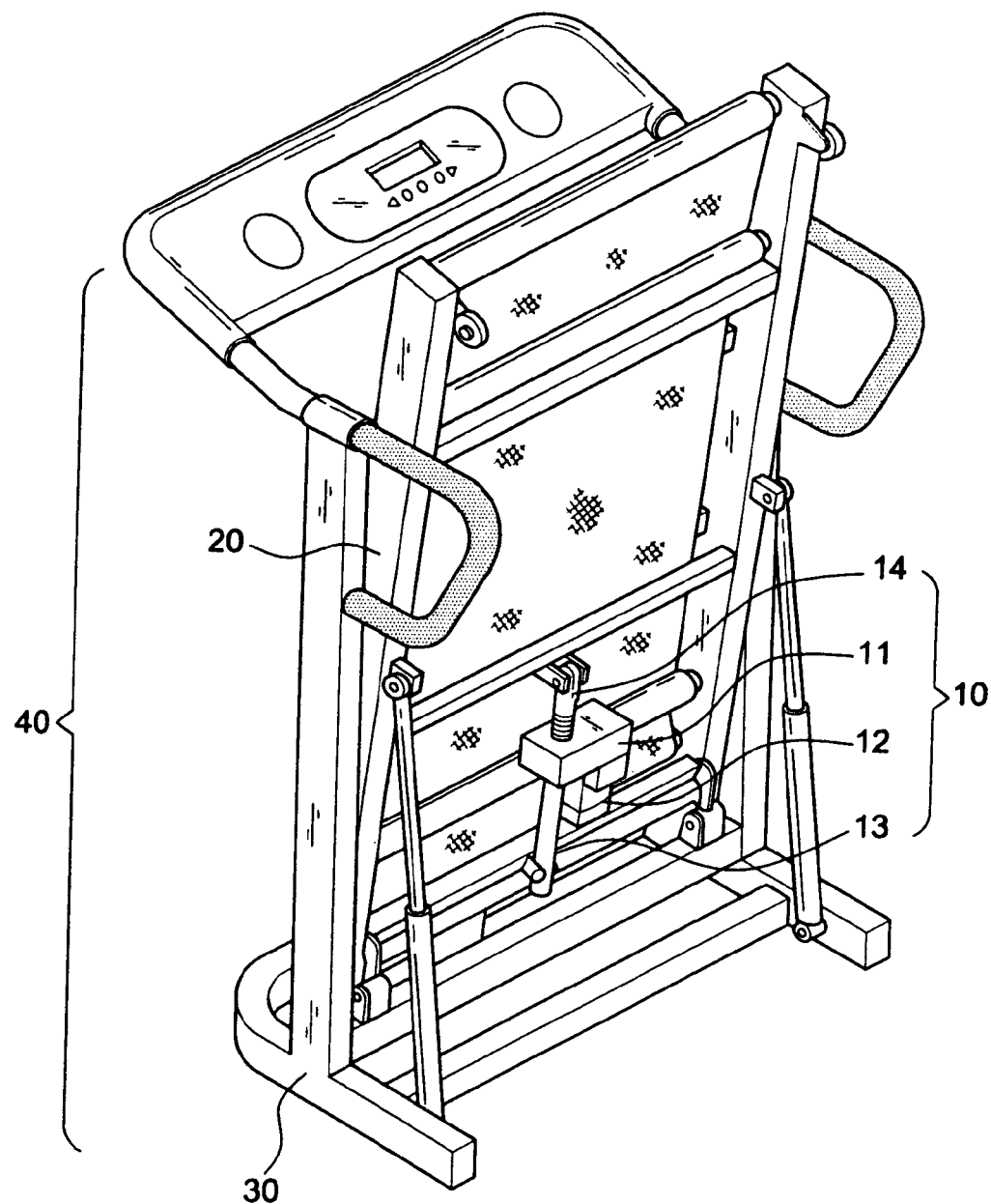
FIG. 1 is a perspective view of an application of a conventional elevating motor.
Figure 2:
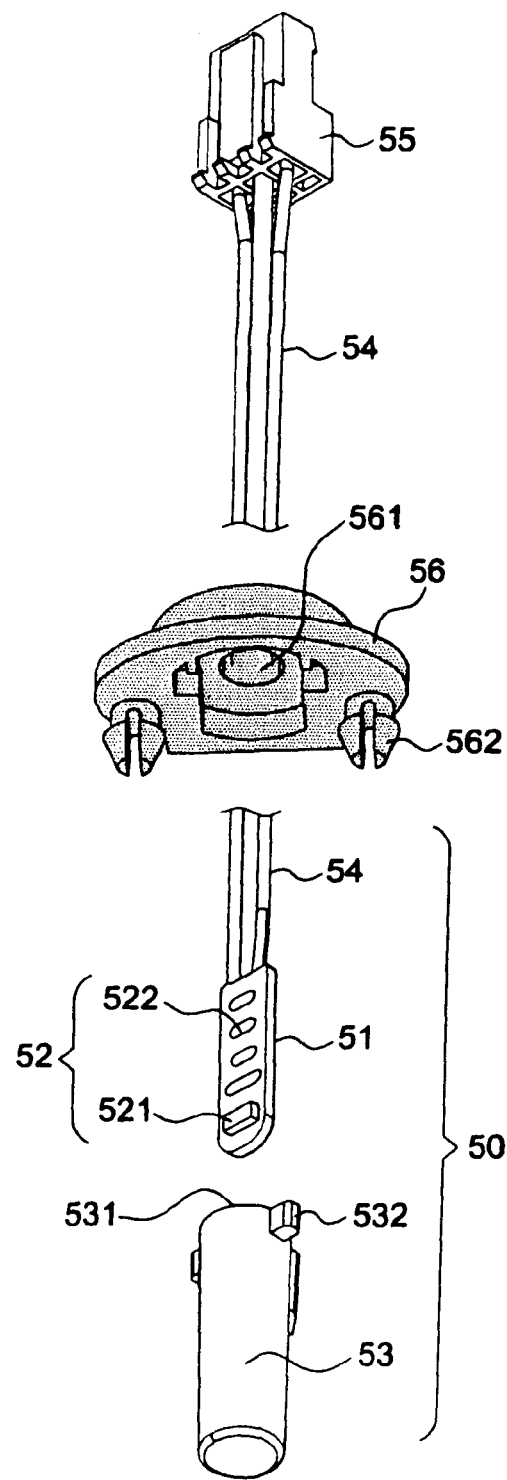
FIG. 2 is an exploded perspective view of a magnetic sensor in accordance with the invention.
Figure 3:
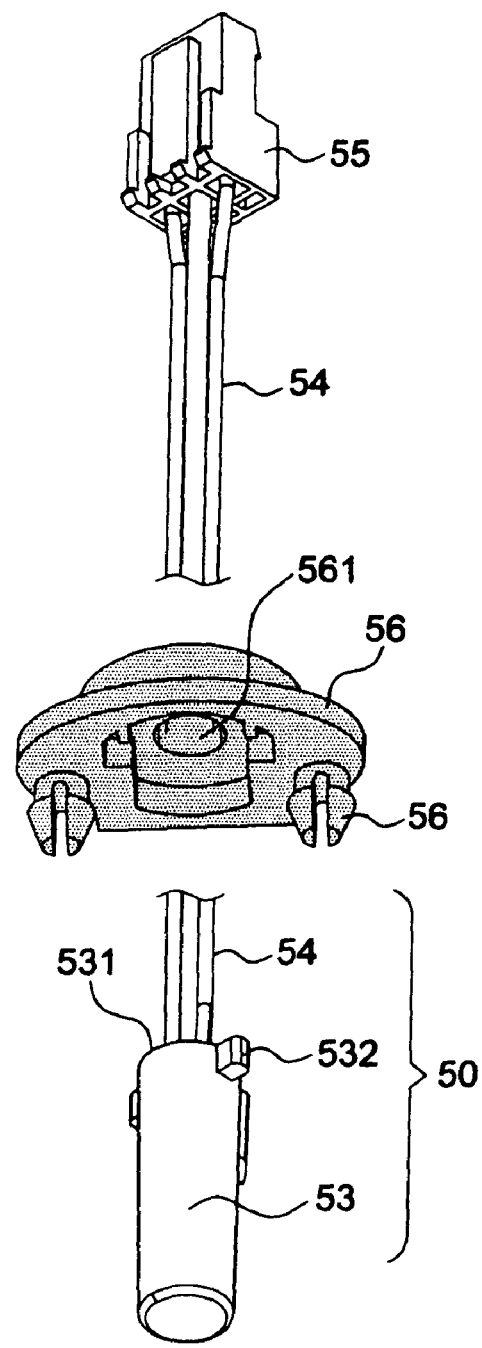
FIG. 3 is a perspective assembly view of the magnetic sensor in accordance with the invention.

The gear box 60 is provided with a mounting hole 64 for the insertion of a magnetic sensor 50 into the gear box 60, thereby creating a built-in structure. As shown in FIGS. 2 and 3, the magnetic sensor 50 includes a circuit board 51, a minor sleeve 53, and a transmission line 54.

The circuit board 51 is provided with magnetic induction elements 52. According to a preferred embodiment, the magnetic induction elements 52 include a Hall IC element 521 and a signal condition circuit 522 that are made by the integrated circuit technology. Accordingly, the advantage of compactness is achieved. According to another embodiment, the Hall IC element 521 can be replaced by a magnetoresistive element.

According to the preferred embodiment, the minor sleeve 53 is made by a magnetically non-permeable material like plastic, acryl, resin, etc. The minor sleeve 53 is transparent so that the circuit board 51 and the magnetic induction elements 52 are visible, but should not be limited thereto. The use of the magnetically non-permeable material is intended for avoiding the interference to the magnetic induction elements 52. The top of the minor sleeve 53 is provided with an opening 531 that is sealed off after the insertion of the circuit board 51 into the minor sleeve 53. According to the embodiment, a plurality of projections 532 are formed at the periphery of the opening 531 of the minor sleeve 53 for fitting into a rubber base 56 in place. The rubber base 56 is locked in the mounting hole 64 of the gear box 60 such that the magnetic sensor 50 is positioned within the gear box 60. A mounting aperture 561 is formed at the center of the rubber base 56 for the insertion of the upper portion of the minor sleeve 53 in position. Two elastic locking lugs 56 are symmetrically arranged at the bottom of the rubber base 56 for a reliable clamping within the mounting hole 64. Accordingly, the minor sleeve 53 fulfills the functions of protecting the circuit board 51 and the magnetic induction elements 52. According to the invention, the magnetic sensor 50 is installed within the gear box 60 so that it is also applicable without the minor sleeve 53.

The transmission line 54 is extended outwards from the circuit board 51 for sending out signals detected by the magnetic induction elements 52. A contact 55 is positioned at the external end portion of the transmission line 54 for a practical establishment of an electric connection to an external calculating display unit 90 (see FIGS. 5 and 6).

As shown in FIG. 6, the magnetic sensor 50 is built within the gear box 60 for detecting magnetic elements 63 rotatable with the transmission gear 62. According to the embodiment, the magnetic elements 63 are permanent magnets that are symmetrically positioned in and rotated with the transmission gear 62 in such a way that the change of the internal magnetic force lines may be detected by the magnetic sensor 50. In this way, a non-contact rotation detection is achieved. Moreover, the detection data is displayed by the calculating display unit 90.

Accordingly, the magnetic sensor 50 in accordance with the invention is modularized in a small dimensions for a convenient installation within the gear box 60. Moreover, the driving motion may be accurately measured. In addition, the built-in structure is not easily affected and damaged by the external environment, thereby prolonging the service life and enhancing the reliability of the product.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A magnetic sensor for an elevating motor, comprising:
   a) a gear box internally having a reduction gear unit and a transmission gear meshed with the reduction gear unit;
   b) a motor secured to the outside of the gear box for driving the gears within the gear box;
   c) a screw rod passing through the gear box and screwed with the transmission gear; and
   d) a minor sleeve made by a magnetically non-permeable material and having an opening,
   wherein the gear box is provided with a mounting hole for the insertion of a magnetic sensor into the gear box, thereby creating a built-in structure for detecting magnetic elements rotatable with the transmission gear such that the change of the internal magnetic force lines within the housing may be detected by the magnetic sensor, thereby achieving a non-contact rotation detection; and
   wherein the magnetic sensor includes:
   i) a circuit board provided with magnetic induction elements; and
   ii) a transmission line extended outwards from the circuit board for sending out detection signals;
   said opening of said minor sleeve being sealed off after the insertion of said circuit board into said minor sleeve;
   wherein a plurality of projections are formed at the periphery of the opening of the minor sleeve for fitting into a rubber base in place, the rubber base is locked in the mounting hole of the gear box such that the magnetic sensor is positioned within the gear box and a mounting aperture is formed at the center of the rubber base for the insertion of the upper portion of the minor sleeve in position, and wherein two elastic locking lugs are symmetrically arranged at the bottom of the rubber base.

2. The magnetic sensor for an elevating motor as recited in claim 1 wherein the magnetic induction elements include a Hall IC element and a signal condition circuit that are made by the integrated circuit technology.

3. The magnetic sensor for an elevating motor as recited in claim 1 wherein the magnetic induction elements include a magnetoresistive element and a signal condition circuit that are made by the integrated circuit technology.

4. The magnetic sensor for an elevating motor as recited in claim 1 wherein the transmission line includes a contact for a practical establishment of an electric connection to an external calculating display unit.

5. The magnetic sensor for an elevating motor as recited in claim 1 wherein the magnetic elements are permanent magnets that are symmetrically positioned in and rotated with the transmission gear.

* * * * *